(12) United States Patent
Goodman (10) Patent No.: US 6,664,803 B2
(45) Date of Patent: *Dec. 16, 2003

(54) METHOD AND APPARATUS FOR SELECTING AN ENCRYPTION INTEGRATED CIRCUIT OPERATING MODE

(75) Inventor: James Goodman, Ottawa (CA)

(73) Assignee: MOSAID Technologies, Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/176,704

(22) Filed: Jun. 20, 2002

(65) Prior Publication Data

US 2002/0175698 A1 Nov. 28, 2002

Related U.S. Application Data

(63) Continuation of application No. 09/862,339, filed on May 23, 2001, now Pat. No. 6,466,048.

(51) Int. Cl.[7] .............................. H03K 19/00; H04L 9/00
(52) U.S. Cl. .............................. 326/8; 326/16; 326/38; 380/3; 380/59; 713/49; 713/189
(58) Field of Search .............................. 326/8, 16, 38; 380/59; 713/189, 89; 327/142, 143

(56) References Cited

U.S. PATENT DOCUMENTS

| 5,638,306 | A | | 6/1997 | Intrater et al. ............... 364/579 |
|---|---|---|---|---|
| 5,828,824 | A | | 10/1998 | Swoboda ................ 395/183.01 |
| 6,065,106 | A | | 5/2000 | Deao et al. .................... 712/24 |
| 6,072,328 | A | * | 6/2000 | Takuma .......................... 326/8 |
| 6,081,885 | A | | 6/2000 | Deao et al. ................. 712/227 |
| 6,118,296 | A | * | 9/2000 | Ozaki ........................... 326/16 |
| 6,184,048 | B1 | | 2/2001 | Ramon ......................... 438/14 |
| 6,331,784 | B1 | * | 12/2001 | Mason et al. ................... 326/8 |
| 6,466,048 | B1 | * | 10/2002 | Goodman ....................... 326/8 |
| 6,472,902 | B2 | * | 10/2002 | Seki et al. ..................... 326/16 |

* cited by examiner

Primary Examiner—Vibol Tan
(74) Attorney, Agent, or Firm—Hamilton, Brook, Smith & Reynolds, P.C.

(57) ABSTRACT

A method and circuit for preventing external access to secure data of an integrated circuit while supporting DFT is disclosed. In accordance with the method the integrated circuit is automatically placed into the test mode at integrated circuit power-up from a power-down state. At power up, secure data is other than present within a secure datapath of the integrated circuit. Access is provided to the secure data path via a second data path coupled with the first secure data-path. Via the access path, data other than secure data is provided to the integrated circuit, the data for performing test functions of the integrated circuit operating in the test mode. Once data other than secure data is provided to first secure data path, the test mode is terminated and access via other than the secure ports is disabled. The test mode is only re-entered by powering down the integrated circuit and re-initialising it.

30 Claims, 6 Drawing Sheets

METHOD AND APPARATUS FOR SELECTING AN ENCRYPTION INTEGRATED CIRCUIT OPERATING MODE

RELATED APPLICATION

This application is a continuation of U.S. application Ser. No. 09/862,339 filed May 23, 2001 now U.S. Pat. No. 6,466,048. The entire teachings of the above application are incorporated herein by reference.

BACKGROUND OF THE INVENTION

Integrated circuits are designed typically to operate in two distinct modes, but not at a same time, including a test mode, and a work mode for performing normal processing functions. Integrated circuits of this type are generally referred to as designed for test (DFT). When operating in the test mode, a designer has access to electronic information internal to the integrated circuit, including the contents of memory registers and the step-by-step microcode that is executed within the microprocessor. After a testing operation is completed, the designer switches the integrated circuit to the work mode, and normal processing operations of the integrated circuit are performed.

Entry into the test mode for integrated circuits is often accomplished through one of dynamic entry and static entry. Dynamic entry into the test mode is accomplished by clocking and latching the required test mode condition into the device being tested. The clocking and latching mechanism of dynamic entry offers the advantage of keeping all of the integrated circuit pins free for usage even after the test mode has been entered. However, a disadvantage of dynamic entry is that the test mode may be accidentally entered if the test mode condition is latched into the device when the test mode is not desired.

Static entry into a test mode is accomplished by supplying a static super voltage to one or more pins of the device being tested for the duration of the test mode. Static entry into a test mode is practical when it is other than a requirement that all integrated circuit pins remain available for use during a test mode. Static entry into a test mode offers the advantages of being simpler to implement and easier to escape unintentional entry into a test mode than dynamic entry. Escape from the test mode, after legitimate entry, occurs at any time that the voltage level of the super voltage other than exceeds a predetermined voltage level. Of course, a drawback of static test mode entry is that unintentional entry into a test mode can result from overshoots or undershoots on pins during normal operation in noisy systems.

The prior art methods for placing an integrated circuit into a test mode are suitable when the integrated circuit is used in a system in which privacy and secrecy of the data is other than of critical importance. For instance, in such systems it is other than necessary to ensure that data within the integrated circuit remains inaccessible during operation of the device. In the case of a cryptographic processor system, however, it is a primary concern that external access to the secure electronic keys and/or other cipher data that are stored within the integrated circuit is at all times denied from outside the device. Further, in addition to denying unauthorized access to secure data by an unintended third party, the authorized and intended user of the integrated circuit must also be other than able to probe the contents of the integrated circuit when the integrated circuit is operating in test mode. In fact, a known method to secure data occurs upon detecting an attempt to probe the contents of the integrated circuit, using either electronic or mechanical means, results in clearing, deactivation and/or self-destruction of the encryption unit. Such extreme security precautions are required in order for a cryptographic system to be compliant with existing security protocols, for instance the FIPS-140 requirements.

It will be obvious to one of skill in the art that such extreme security precautions are necessary in order to prevent key compromise, and thus to ensure the integrity and secrecy of the private keys that are stored within the memory circuit of the encryption unit. The compromise of a private key by an unauthorized third party allows immediately any data that is passed through the encryption unit to be converted back into a plain text form and to be read by the third party. When such data includes financial information or information of a personal and confidential nature, then the potential also exists for the unauthorized third party to cause serious inconvenience and/or financial loss to a legitimate user of the encryption unit. Even the compromise of a single bit of a secure key, for instance a 128-bit secure encryption key, reduces the effectiveness of the secure key by a significant factor. Further, it will be obvious to one of skill in the art that since computer processing power continues to double approximately every two years, the secure keys that are in use today are susceptible to key compromise in the future. It is, therefore, of critical importance that encryption systems being implemented in the present are designed such as to prevent the compromise of even a single bit of a secure key stored therein.

Of course, the inability to probe the electronic data contents of a prior art encryption unit precludes the possibility of performing legitimate and often necessary trouble-shooting procedures. In the case of an integrated circuit that is used in an encryption unit, such trouble-shooting is of particular importance since any data that is provided to the unit for encryption is permanently unrecoverable if the encryption unit performs within other than as expected. It is therefore critically important to ensure that the encryption unit is performing as expected prior to providing secure data thereto for encryption. In particular, trouble-shooting functions are often necessary when data that was previously provided to an encryption unit for encryption is other than recoverable by an intended recipient, and when a new encryption unit is added to a computer system.

It would be advantageous to provide a system and a method for placing an integrated circuit of a cryptographic unit into a test mode of operation in a manner that at all times prevents external access to secure data stored therein. It would be further advantageous to provide a system and a method for locking out re-entry into the test mode once the encryption system begins performing secure operations. Further, it would be advantageous to provide a system and a method for placing an integrated circuit of a cryptographic unit into a test mode of operation that is compliant with existing security protocols, for instance the FIPS-140 protocols.

OBJECT OF THE INVENTION

In an attempt to overcome these and other limitations of the prior art, it is an object of the present invention to provide a system and a method for the secure switching of an encryption processor of a cryptographic system between a first and a second mode of operation, wherein access to secure electronic keys stored within the cryptographic system is prevented.

In an attempt to overcome these and other limitations of the prior art, it is an object of the present invention to provide a system and a method for the secure switching of an encryption processor of a cryptographic system between a first and a second mode of operation absent specialized equipment and/or expert knowledge of the cryptographic system.

SUMMARY OF THE INVENTION

In accordance with the invention, there is provided a method for preventing external access to secure data of an integrated circuit operating in a test mode comprising the steps of:

a) placing the integrated circuit into the test mode at integrated circuit power-up from a power-down state of the integrated circuit, such that secure data is other than present within a first secure data-path of the integrated circuit;

b) providing access to the first secure data path being absent secure data from a second data path coupled with the first secure data-path; and, c) disabling the test mode in dependence upon secure data being provided via other than the second data-path to the first secure data-path, the secure data for processing by the integrated circuit, wherein disabling the test mode causes the integrated circuit to enter a locked secure-mode-state, such that re-entry into the test mode is other than possible prior to the integrated circuit being powered-down.

In accordance with the invention, there is also provided an integrated circuit comprising:

operational circuitry of the integrated circuit for performing secure processing operations;

a secure port in communication with the operational circuitry and with the logic circuit, the secure port for providing secure data to the operational circuitry for processing; and test circuitry of the integrated circuit in electrical communication with the operational circuitry for performing testing functions;

a test-mode-enable logic circuit comprising:

a logic circuit responsive to power being initially applied to the integrated circuit for at power-up enabling the test circuitry of the integrated circuit; and, a switch responsive to data provided to the operational circuitry via the secure port for switching the integrated circuit to disable the test circuitry thereof.

DETAILED DESCRIPTION OF THE INVENTION

Figure 1:
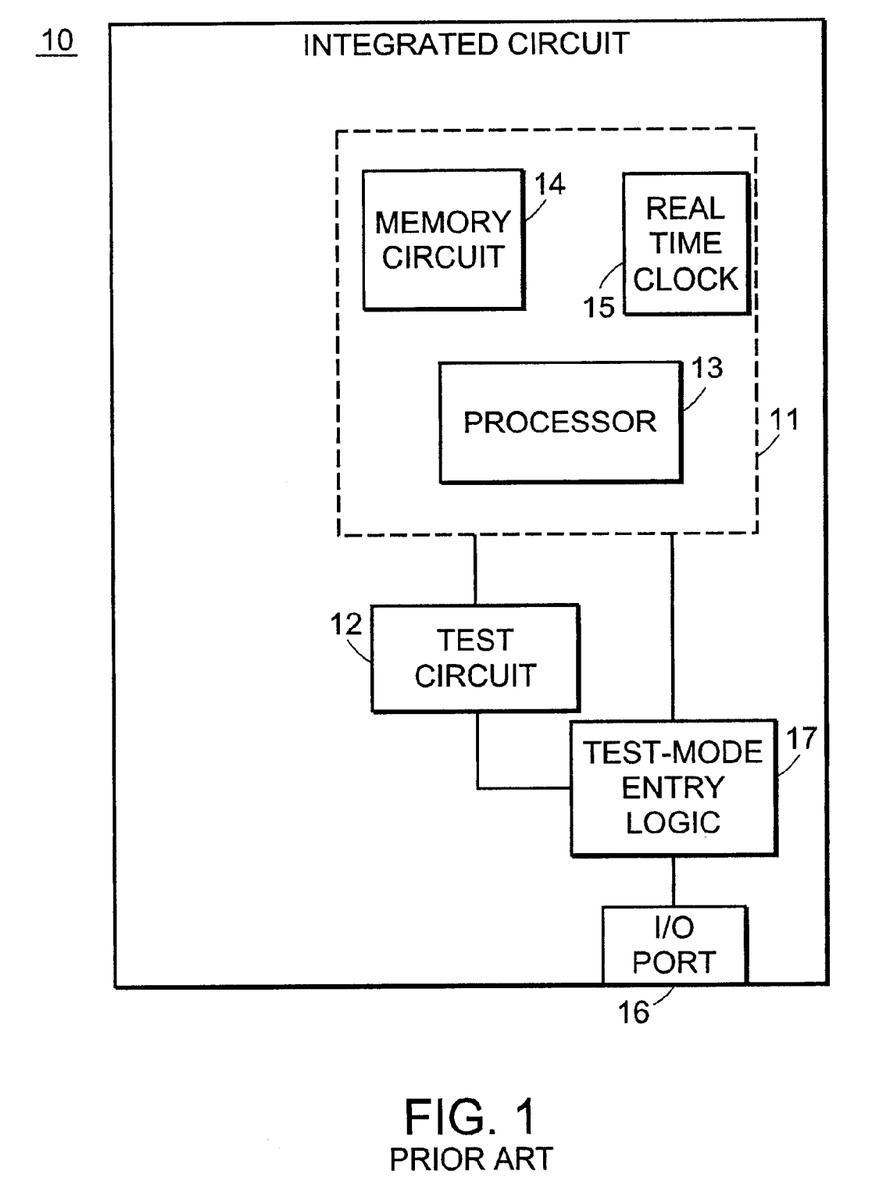
FIG. 1 shows a simplified block diagram of an integrated circuit according to the prior art.

Referring to FIG. 1, a simplified block diagram of an integrated circuit according to the prior art is shown generally at 10. Integrated circuit 10 comprises operational circuitry 11 in electrical communication with a test circuit 12. The operational circuitry 11 includes a processor 13 and a memory circuit 14 in operative communication with the processor 13, the memory circuit 14 for storing data for processing by the processor 13. Optionally, the processor 13 is in communication with a real time clock 15 for providing a time value that is useable by the processor 13 for performing time-stamping functions. Integrated circuit 10 is operable in two modes, but not at a same time, including a work mode and a test mode. The operational circuitry 11 is for performing predetermined processing operations of the integrated circuit 10 when the circuit 10 is operating in the work mode. The test circuitry 12 is for performing diagnostic functions when the circuit 10 is operating in the test mode, for instance the test circuit 12 is for examining the contents and/or status of memory registers of memory circuit 14.

In use, data is provided to the integrated circuit 10 from a client station (not shown) via a communications path including an input/output port 16. Input/output port 16 includes a plurality of device pins (not shown) for receiving data that is provided by the client station for processing by the processor 13 of the integrated circuit 10. Often, each device pin has a predetermined function assigned to it, for example a pin for receiving a test mode enable signal from the client station and for providing said test mode enable signal to a test-mode-entry logic circuit 17. Test-mode-entry logic circuit 17 places the integrated circuit 10 into test mode in dependence upon receiving a predetermined test mode-enable-signal from the client station.

Of course, a second function of the test-mode-entry logic circuit 17 is to prevent accidental entry into the test mode during normal operation of the integrated circuit 10. As was discussed previously, various systems have been developed and implemented in integrated circuits to allow for test mode entry of the integrated circuit during the manufacturing process, while preventing an end-user from accidentally entering into test mode at a later time. The prior art schemes for avoiding accidental entry into a test mode of an integrated circuit do not, however, prevent external probing of the electronic data that is stored within the integrated circuit. As will be obvious to one of skill in the art, legitimate entry into test mode poses a serious security concern when the data that is contained within the integrated circuit is secure data. For instance, an integrated circuit within a cryptographic system often contains secure electronic keys within a non-volatile memory circuit thereof. In order for an integrated circuit to be compliant with existing cryptographic protocols, such as for instance the FIPS-140 requirements, the secure data that is stored therein must be inaccessible from outside of the integrated circuit at all times.

Figure 2:
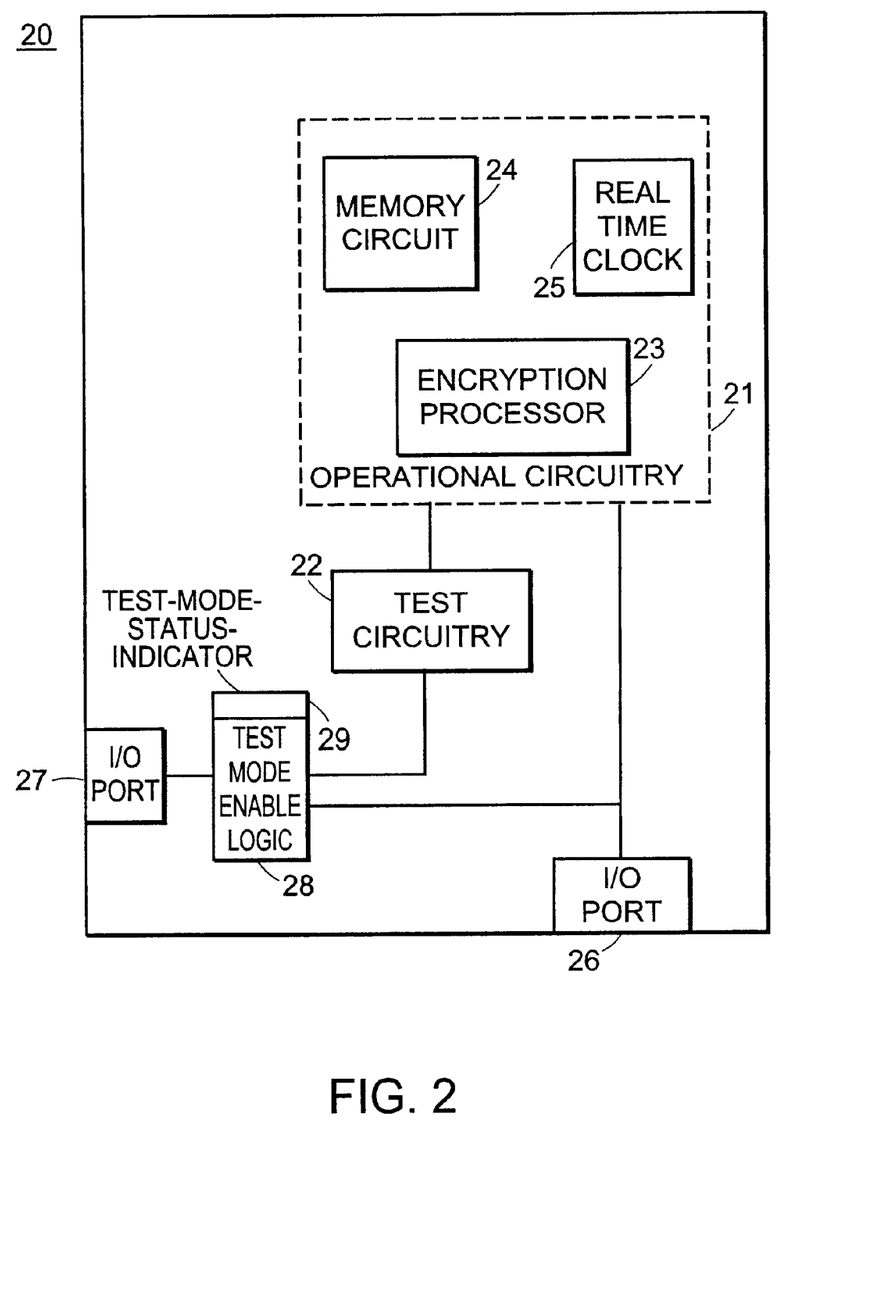
FIG. 2 shows a simplified block diagram of an integrated circuit according to a first preferred embodiment of the present invention.

Referring to FIG. 2, shown is an integrated circuit 20 according to a first preferred embodiment of the present invention. The integrated circuit 20 comprises operational circuitry 21 in electrical communication with test circuitry 22. The operational circuitry 21 includes an encryption processor 23 that is in operative communication with a memory circuit, for instance a volatile memory circuit 24, the memory circuit 24 for storing at least a secure electronic key. Optionally, the processor 23 is in electrical communication with a real time clock 25, the real time clock 25 for providing a time value that is useable by the processor 23 for performing time-stamping functions. Integrated circuit 20 further comprises a secure input/output port 26 for receiving secure data for processing by the encryption processor 23 and a test-mode input/output port 27 for receiving test data, for instance private keys that are other than secure. The test port 27 and the secure input/output port 26 are in electrical communication separately with a test-mode-enable logic circuit 28, which includes a test-mode-status-indicator bit 29.

Of course the integrated circuit 20 is operable in two modes, but not at a same time, including a work mode and a test mode. The operational circuitry 21 is for performing predetermined processing operations of the integrated circuit 20 when the circuit 20 is operating in the work mode. For instance, secure data is provided to the encryption processor 23 via the secure port 26 for encryption by the processor 23 using at least a secure electronic key that is stored in the memory circuit 24. Since the memory circuit 24 comprises volatile memory, the at least a secure electronic key is provided to the circuit 20 from a secure source, such as for instance a second other integrated circuit that is in operative communication with the circuit 20, following the integrated circuit power-up. Optionally, the processor 23 generates a secure key according to a predetermined algorithm following the integrated circuit power-up for use in, for example, secure communication sessions.

The test circuit 22 is for performing diagnostic functions of the circuit 20 when the circuit 20 is operating in the test mode. Entry into test mode occurs only during a period of time that is approximately coincident with the application of a voltage to circuit 20, the voltage being applied to power the integrated circuit 20 from an existing state of being powered down. Absent an on-board power supply, the volatile memory circuit 24 initializes to a state of being empty—having unknown memory contents or predetermined non-secure memory contents—at power-up, such that secure data previously stored therein is other than present when the circuit 20 enters the test mode at power-up. In the present embodiment, entry into test mode requires a legitimate user to provide a test-mode-enable signal to the test-mode-enable logic circuit 28 during the period of time that is approximately coincident with the application of a voltage to circuit 20. The test-mode-enable logic circuit 28 initializes the integrated circuit into a known, test mode of operation in dependence upon receiving said test-mode-enable signal. For instance, the test-mode-status-indicator bit 29 is set to a default value indicative of a test-mode-enabled status of the integrated circuit 20. Advantageously, access to secure data from outside of the integrated circuit is avoided because the circuit 20 enters the test mode only from a powered-down state, which powered down state results in complete erasure of secure data within the integrated circuit 20. Of course, absent the test-mode-enable signal, the test-mode-enable logic circuit 28 initializes the integrated circuit into the work mode, for instance the test-mode-enable logic circuit 28 sets the test-mode-status-indicator bit 29 to a second other value indicative of a test-mode-locked-out status of the integrated circuit 20. Optionally, entry into the test mode occurs automatically every time at circuit power-up.

Once the test mode has been legitimately entered, test data is provided to the integrated circuit 20 via the test port 27. For instance, at least a private test key that is other than secure is provided to the circuit 20 and is stored in volatile memory circuit 24. The encryption processor 23 uses the at least a private test key to encrypt test data that is provided via the test port 27 for encryption by the encryption processor 23. The encrypted test data is used subsequently for diagnostic purposes, for example to correct errors in the mathematical algorithms used by the encryption processor 23 to encrypt secure data when operating in the work mode. Advantageously, only test data that is other than secure is present within the integrated circuit 20 during operation in test mode, such that access to secure data from outside of the circuit 20 is avoided.

The integrated circuit 20 continues operating in the test mode until such time that the voltage is removed from the integrated circuit 20, for example upon completion of the test functions, at which time the integrated circuit is powered-down for shipping to a client. Alternatively, the integrated circuit 20 operates continuously in the test mode until such time that the test-mode-enable logic circuit 28 changes the value of the bit 29. For instance, when secure data is received at the integrated circuit 20 via secure port 26, the test-mode-enable logic circuit 28 changes the value of the bit 29 to a second value other than the default value, the second value indicative of a test-mode-locked-out status of the integrated circuit 20. The test-mode-enable logic circuit 28 includes a circuit for setting the bit 29 to the second value, but does not include a circuit for resetting the bit 29 to the default value after the bit 29 is set to the second value. The bit 29 is reset to the default value only by powering-down the integrated circuit 20 and then powering the circuit up again. Advantageously, the process of clearing the bit 29 by powering-down the integrated circuit 20 also causes data, including secure data, which is present within the volatile memory circuit 24 to be erased. Thus, at any time when the circuit 20 is powered-up and the test mode is entered, secure data is other than present within the circuit.

Figure 3:
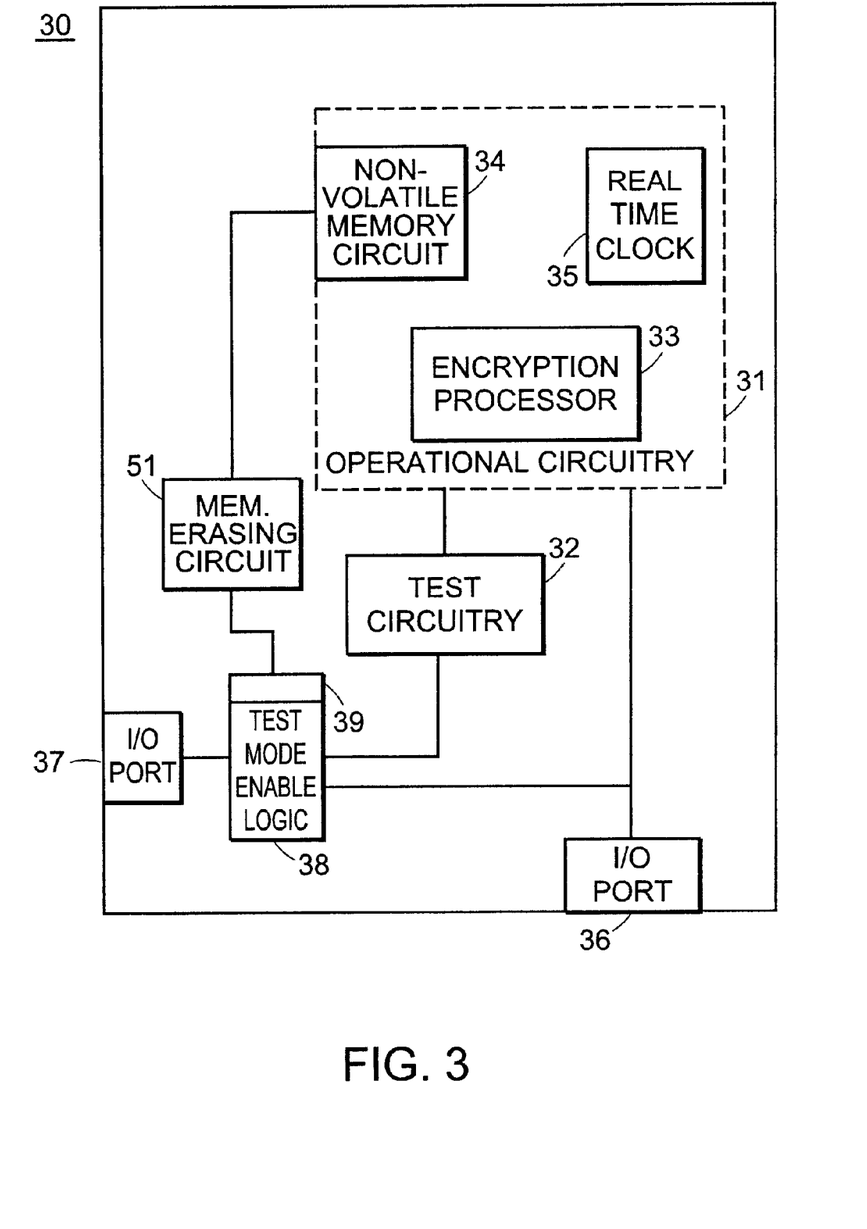
FIG. 3 shows a simplified block diagram of an integrated circuit according to a second preferred embodiment of the present invention.

Referring to FIG. 3, an integrated circuit according to a second preferred embodiment of the present invention is shown generally at 30. The integrated circuit 30 comprises operational circuitry 31 in electrical communication with test circuitry 32. The operational circuitry 31 includes an encryption processor 33 that is in operative communication with a memory circuit, for instance a non-volatile memory circuit 34, the memory circuit 34 for storing at least a secure electronic key. Optionally, the encryption processor 33 is in electrical communication with a real time clock 35, the real time clock 35 for providing a time value that is useable by the encryption processor 33 for performing time-stamping functions. Integrated circuit 30 further comprises a secure input/output port 36 for receiving secure data for processing by the encryption processor 33 and a test-mode input/output port 37 for receiving test data, for instance private keys that are other than secure. The test port 37 and the secure input/output port 36 are in electrical communication separately with a test-mode-enable logic circuit 38, which test-mode-enable logic circuit 38 includes a test-mode-status-indicator bit 39.

The integrated circuit 30 is operable in two modes, but not at a same time, including a work mode and a test mode. The operational circuitry 31 is for performing predetermined processing operations of the integrated circuit 30 when the circuit 30 is operating in the work mode. The test circuit 32 is for performing diagnostic functions of the circuit 30 when the circuit 30 is operating in the test mode. Entry into test mode occurs only during a period of time that is approximately coincident with the application of a voltage to circuit 30, the voltage being applied to power-up the integrated circuit 30 from an existing state of being powered-down. In the present embodiment, entry into the test mode requires a user to provide a test-mode-enable signal to the test-modeenable logic circuit 38 via test port 37 during the period of time that is approximately coincident with the application of a voltage to the circuit 30. The test-mode-enable logic circuit 38 initializes the integrated circuit to a known, test mode of operation. For instance, the bit 39 is set to a default value that is indicative of a test-mode-enabled status of the integrated circuit 30. Since the integrated circuit includes non-volatile memory 34, a memory erasing circuit 51 is disposed between the test-mode-enable logic circuit 38 and the non-volatile memory 34. The memory erasing circuit 51 is for erasing secure data that is stored in the non-volatile memory circuit 34, prior to test mode entry of integrated circuit 30, such that access to secure data while the integrated circuit 30 operates in test mode is other than possible.

Once the test mode has been entered, test data is provided to the integrated circuit 30 via the test port 37. For instance, at least a private test key that is other than secure is provided to the circuit 30 and is stored in non-volatile memory circuit 34. The encryption processor 33 uses the at least a private test key to encrypt test data that is provided via the test port 37 for encryption by the encryption processor 33. The encrypted test data is used subsequently for diagnostic purposes, for example to correct errors in the mathematical algorithms used by the encryption processor 33 to encrypt data. Advantageously, only test data that is other than secure is present within the integrated circuit 30 during operation in the test mode, such that access to secure data from outside of the circuit 30 is avoided.

The integrated circuit 30 continues operating in the test mode until such time that the voltage is removed from the integrated circuit 30, for example upon completion of the test functions, at which time the integrated circuit is powered-down for shipping to a client. Alternatively, the integrated circuit 30 operates continuously in the test mode until such time that the test-mode-enable logic circuit 38 changes the value of the bit 39. For instance, when secure data is received at the integrated circuit 30 via secure port 36, the test-mode-enable logic circuit 38 changes the value of the bit 39 to a second value other than the default value, the second value indicative of a test-mode-locked-out status of the integrated circuit 30. The test-mode-enable logic circuit 38 includes a circuit for setting the bit 39 to the second value, but does not include a circuit for resetting the bit 39 to the default value after the bit 39 is set to the second value. The bit 39 is reset to the default value only by powering-down the integrated circuit 30 and then powering the circuit up again. Most preferably, the test-mode-enable signal is accepted by the test-mode-enable logic circuit 38 only during the period of time that is approximately coincident with the application of a voltage to the circuit 30. The signal is only available during power-up of the circuit 30, such that secure data is other than present within in secure pathways of the integrated circuit 30. Hence, access to secure electronic keys and secure data avoided during operation of the integrated circuit 30 in test mode.

Alternatively, when a data erasing circuit is present, a test mode enable pin is possible to allow entry into test mode wherein all data within the device is erased prior to enabling of the test mode. Typically, this is not desirable since it requires extra circuitry to erase data within the data pathways, buffers, and registers and, once all data is cleared, the integrated circuit is same as one which is freshly powered up and as such provides few advantages.

Figure 4:
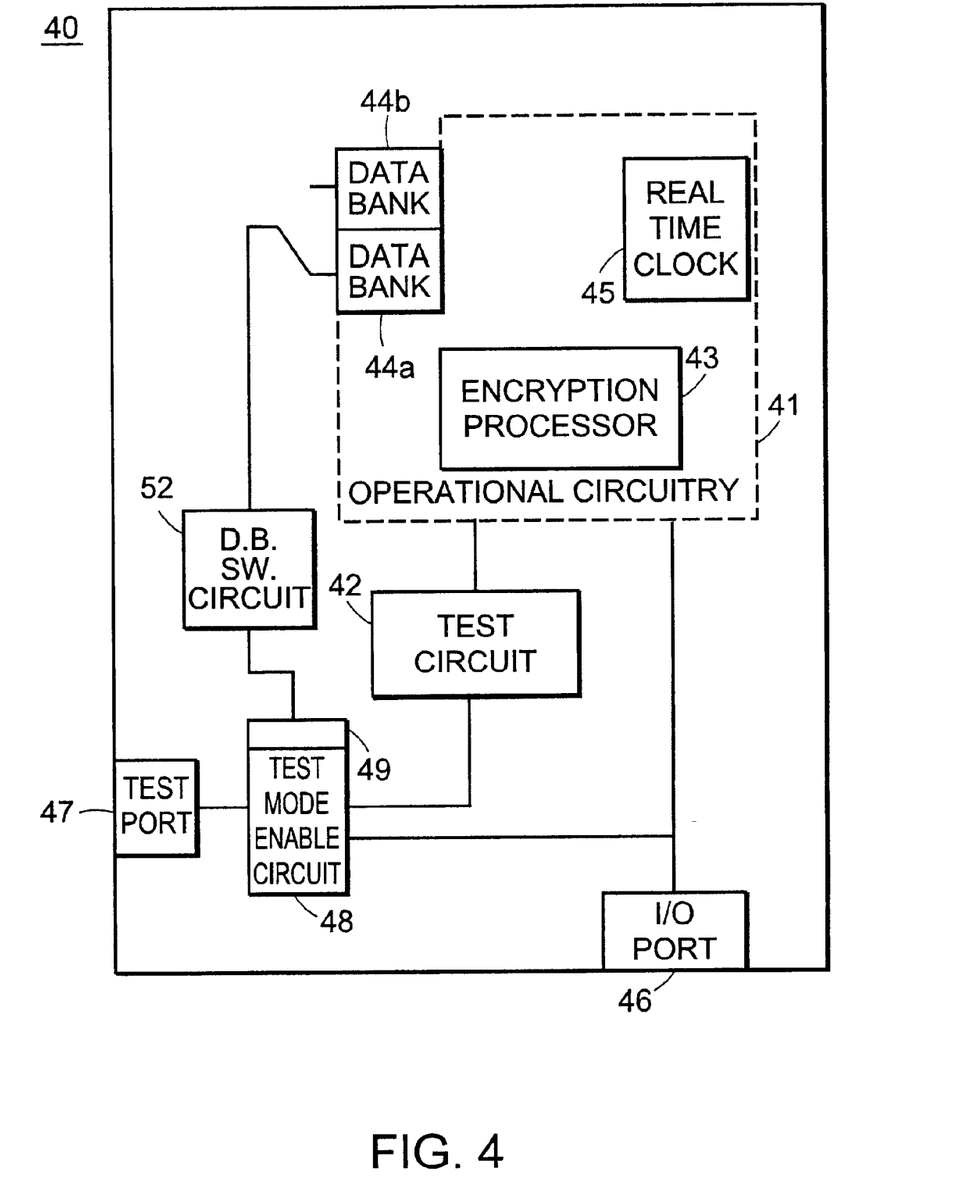
FIG. 4 shows a simplified block diagram of an integrated circuit according to a third preferred embodiment of the present invention.

Referring to FIG. 4, an integrated circuit according to a third preferred embodiment of the present invention is shown generally at 40. The integrated circuit 40 comprises operational circuitry 41 in electrical communication with test circuitry 42. The operational circuitry 41 includes an encryption processor 43 that is in operative communication with a memory circuit 44, for instance a non-volatile memory circuit including a first data bank 44a and a second other data bank 44b. The first data bank 44a is for storing at least a secure electronic key for use by the encryption processor to encrypt data, and the second other data bank 44b is for storing only test data which is other than secure. Optionally, the encryption processor 43 is in electrical communication with a real time clock 45, the real time clock 45 for providing a time value that is useable by the encryption processor 43 for performing time-stamping functions. Integrated circuit 40 further comprises a secure input/output port 46 for receiving secure data for processing by the encryption processor 43 and a test-mode input/output port 47 for receiving test data, for instance private keys that are other than secure. The test port 47 and the secure input/output port 46 are in electrical communication separately with a test-mode-enable logic circuit 48, which test-mode-enable logic circuit 48 includes a test-mode-status-indicator bit 49.

The integrated circuit 40 is operable in two modes, but not at a same time, including a work mode and a test mode. The operational circuitry 41 is for performing predetermined processing operations of the integrated circuit 40 when the circuit 40 is operating in the work mode. The test circuit 42 is for performing diagnostic functions of the circuit 40 when the circuit 40 is operating in the test mode. Entry into test mode occurs only during a period of time that is approximately coincident with the application of a voltage to circuit 40, the voltage being applied to power-up the integrated circuit 40 from an existing state of being powered-down. In the present embodiment, entry into the test mode requires a user to provide a test-mode-enable signal to the test-mode-enable logic circuit 48 via test port 47 during the period of time that is approximately coincident with the application of a voltage to the circuit 40. The test-mode-enable logic circuit 48 initializes the integrated circuit to a known, test mode of operation. For instance, the bit 49 is set to a default value that is indicative of a test-mode-enabled status of the integrated circuit 40.

Still referring to FIG. 4, two separate data banks 44a and 44b of the non-volatile memory circuit 44 are provided for storing data that is secure and for storing data that is other than secure, respectively. A data bank switching circuit 52 is disposed between the test-mode-enable logic circuit 48 and the non-volatile memory circuit 44 for enabling access to data bank 44a when bit 49 is set to the default value and for enabling access to data bank 44b when bit 49 is set to the second other value. Thus, in the present embodiment secure data is present within the circuit 40 during operation in the test mode, said secure data being made inaccessible by disabling access to and/or electrically isolating the first data bank 44a when the circuit 40 is operating in the test mode.

Of course, the third embodiment of the present invention provides other than a true test mode, for instance it is other than possible to probe the contents of the first data bank 44a that stores secure data. The user performing the test operation must assume that the first data bank 44a works correctly, and that a particular problem is in the actual data processing performed by the processor 43. Conveniently, the user is able to complete the test functions within the pseudo-test mode and avoid permanent erasure of the secure electronic keys that are required when the circuit 40 is switched back to work mode. Optionally, a true test mode is provided for certain pathways of the circuit 40 in addition to the pseudo-test mode. Of course, in such case, the pathways are necessarily clear when the integrated circuit initiates test mode thereof.

Figure 5:
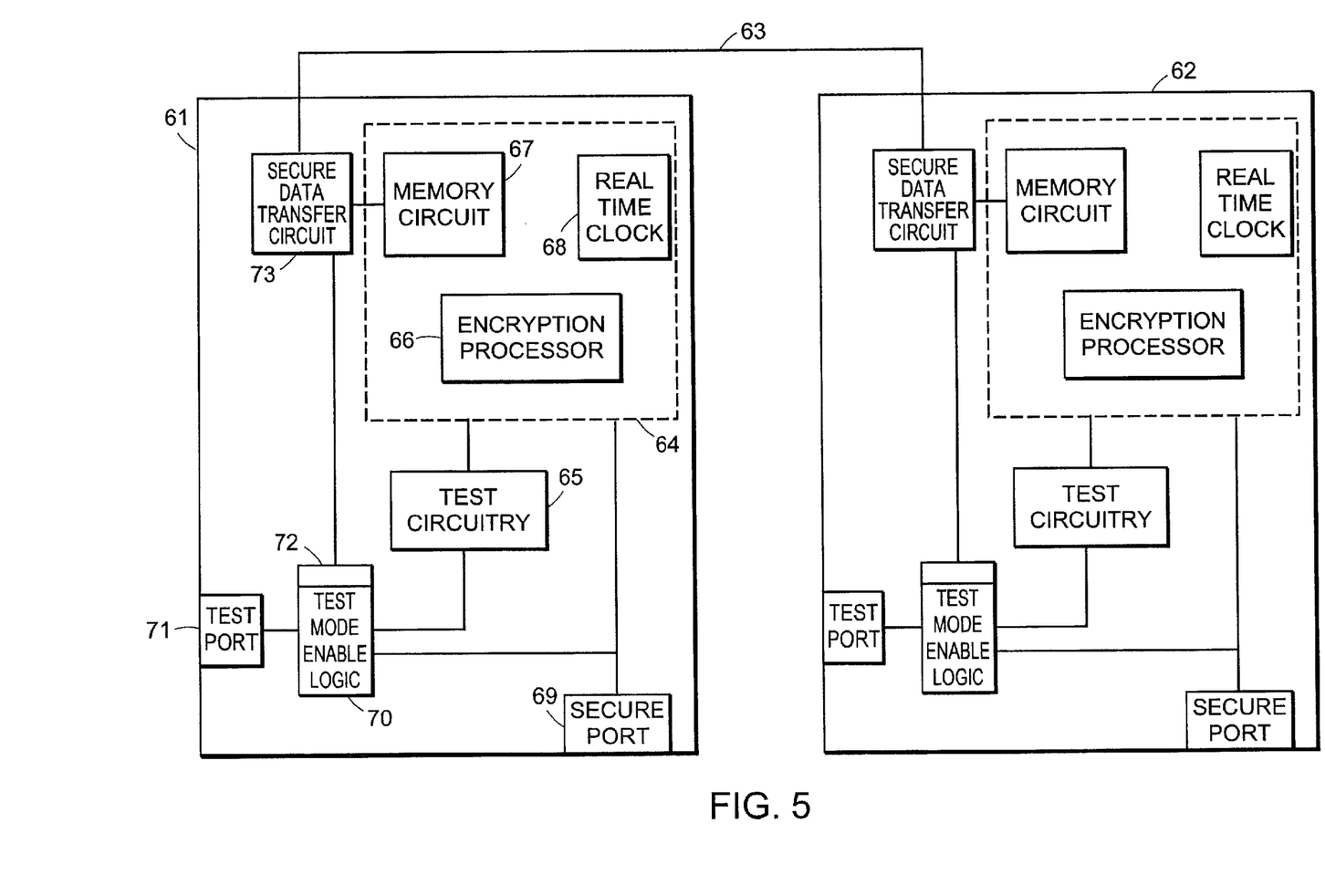
FIG. 5 is a simplified flow diagram of method for switching from DFT to work mode for a newly installed module at the initial power-up of the module.

Referring to FIG. 5, a system for test mode entry of an integrated circuit according to a fourth embodiment of the present invention is shown generally at 60. A first integrated circuit 61 is in communication with a second other integrated circuit 62 via a secure communication channel 63. The integrated circuit 61 comprises operational circuitry 64 in electrical communication with test circuitry 65. The operational circuitry 64 includes an encryption processor 66 that is in operative communication with a memory circuit 67, for instance a non-volatile memory circuit. Optionally, the encryption processor 61 is in electrical communication with a real time clock 68, the real time clock 68 for providing a time value that is useable by the encryption processor 61 for performing time-stamping functions. Integrated circuit 61 further comprises a secure input/output port 69 for receiving secure data for processing by the encryption processor 66 and a test-mode input/output port 71 for receiving test data, for instance private keys that are other than secure. The test port 71 and the secure input/output port 69 are in electrical communication separately with a test-mode-enable logic circuit 70, which test-mode-enable logic circuit 70 includes a test-mode-status-indicator bit 72.

The integrated circuit 61 is operable in two modes, but not at a same time, including a work mode and a test mode. The operational circuitry 64 is for performing predetermined processing operations of the integrated circuit 61 when the circuit 61 is operating in the work mode. The test circuit 65 is for performing diagnostic functions of the circuit 61 when the circuit 61 is operating in the test mode. Entry into test mode occurs only during a period of time that is approximately coincident with the application of a voltage to circuit 61, the voltage being applied to power-up the integrated circuit 61 from an existing state of being powered-down. In the present embodiment, entry into the test mode requires a user to provide a test-mode-enable signal to the test-mode-enable logic circuit 70 via test port 71 during the period of time that is approximately coincident with the application of a voltage to the circuit 61. The test-mode-enable logic circuit 70 initializes the integrated circuit to a known, test mode of operation. For instance, the bit 72 is set to a default value that is indicative of a test-mode-enabled status of the integrated circuit 61.

Still referring to FIG. 5, the memory circuit 67 includes non-volatile memory, such that secure electronic keys or other secure data are optionally present within the memory circuit 67 at integrated circuit power-up. Of course, the presence of secure data within the integrated circuit 61 when circuit 61 is operating in test mode poses a serious security concern. Fortunately, systems for the secure transfer of data between integrated circuits are known in the art, for example as disclosed in U.S. patent application Ser. No. 09/305,476 filed May 6, 1999 and U.S. patent application Ser. No. 09/666,093 filed Sep. 21, 2000, the contents of which are incorporated by reference herein. In dependence upon bit 72 being set to a default value indicative of a test-mode-enabled status, a secure-data transfer circuit 73 of the integrated circuit 61 copies secure data from memory circuit 67 to a memory circuit of a second other integrated circuit, for instance integrated circuit 62, via the secure communication channel 63. Once the transfer of any secure data within from memory circuit 67 is complete, the secure-data transfer circuit 73 erases the secure data within memory circuit 67 such that secure data is other than present within integrated circuit 61 during operation in test mode.

The integrated circuit 61 continues operating in the test mode until such time that the voltage is removed from the integrated circuit 61, for example upon completion of the test functions, at which time the integrated circuit is powered-down for shipping to a client. Of course, by simply powering-down the integrated circuit 61 the test-mode is exited without copying the previously erased secure data from the second other integrated circuit 62 back into the memory circuit 67 of the integrated circuit 61. Alternatively, the integrated circuit 61 operates continuously in the test mode until such time that the test-mode-enable logic circuit 70 changes the value of the bit 72. For instance, when secure data is received at the integrated circuit 61 via secure port 69, the test-mode-enable logic circuit 70 changes the value of the bit 72 to a second value other than the default value, the second value indicative of a test-mode-locked-out status of the integrated circuit 61. In dependence upon the bit 72 being set to the second value, the secure-data transfer circuit 73 authenticates itself to the second other integrated circuit 62 and copies the secure data back into the memory circuit 67 of the integrated circuit 61.

Figure 6:
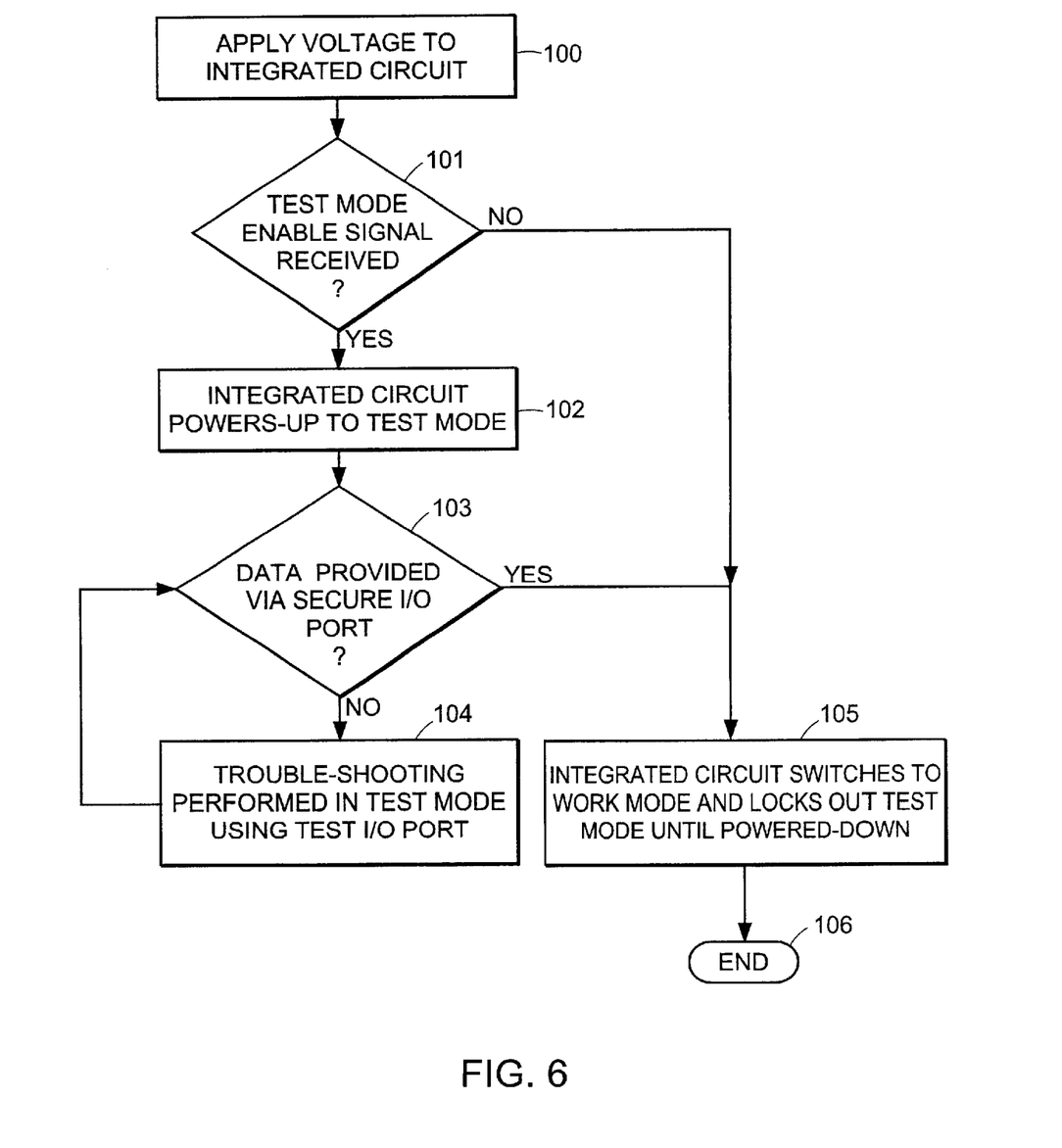
FIG. 6 is a simplified flow diagram of method for switching from work mode to DFT mode and back to work mode for an existing module.

Referring to FIG. 6, shown is a simplified flow diagram of method for placing an integrated circuit into a test mode of operation in a manner which at all times prevents external access to secure data stored within the circuit. At step 100 a voltage is applied to the integrated circuit, the voltage being applied to power-up the integrated circuit from an existing state of being powered-down. At decision step 101 a test-mode-enable logic circuit monitors at least a pin of a test mode input/output port of the integrated circuit for a test-mode enable signal during a period of time that is approximately coincident with the application of the voltage to the circuit. If a test-mode-enable signal is received, then a bit is set to a default value, which default value forces the integrated circuit to power-up to test mode at step 102. If a test-mode enable signal is other than received, then the bit is set to a second value other than the default value, and the integrated circuit is forced to power-up to work mode at step 105. Since there is no corresponding circuit to clear the second value of the bit, the test mode of operation is permanently locked-out until such time that the integrated circuit is powered-down. The integrated circuit continues to operate in test mode until it is determined at decision step 103 that secure data is received via a secure input/output port of the integrated circuit. Approximately immediately upon receipt of the secure data via the secure input/output port, the test-mode-enable logic circuit sets the bit to the second value other than the default value, and the integrated circuit is forced to exit the test mode and re-initialize to the work mode at step 105. Since there is no corresponding circuit to clear the second value of the bit, the test mode of operation is permanently locked-out until such time that the integrated circuit is powered-down. The method of FIG. 6 is terminated at step 106.

Of course, step 102 includes steps for entering test mode that are specific for each embodiment of the present invention. For instance, power-up to test mode step 102 includes the steps of: setting the bit within the test-mode-enable logic circuit to the default value that is indicative of a test-mode-enabled status of the integrated circuit; and, erasing secure data that is stored within the non-volatile memory circuit of the integrated circuit.

Further, the step 101 is optional as in some embodiments the circuit is automatically placed in test mode each time it is powered-up. Since, in installed application the circuit is used for security operations, the secure operation is typically performed shortly after power-up resulting in the circuit entering and remaining in the work mode.

It is an advantage of the present invention that external access to secure data of an integrated circuit is avoided when the integrated circuit is operating in test mode. Further advantageously, entry into test mode is easily accomplished, for example by applying a test-mode-enable signal to a dedicated pin of a test mode input/output port at the integrated circuit power-up. Absent a test-mode-enable signal during power-up, a logic bit is set to a predetermined value such that subsequent entry into test mode is other than possible prior to the integrated circuit being powered down. Thus, entry into the test mode of the integrated circuit is possible only when the data pathways of the integrated circuit other than contain data that is secure. Approximately immediately upon receipt of secure data, for instance via a secure input/output port, the test mode of operation is disabled and the integrated circuit is forced into a work mode, such that external access to secure data within the data pathways of the integrated circuit is other than possible. Of course, once secure data is provided to the integrated circuit re-entry into test mode is other than possible prior to the integrated circuit being powered-down.

Further advantageously, accidental entry into test mode by an end-user of the integrated circuit is avoided since once the end-user has used the integrated circuit for performing secure transactions, the test mode is permanently locked-out until the integrated circuit is powered-down.

In accordance with another embodiment, the memory within the circuit is subject to a self test. This can be achieved through any of a number of processes, some of which are outlined below. Also, the memory within the circuit is optionally tested at any of a number of points in time.

For example, upon applying power to the integrated circuit and before it is placed into test mode, the RAM is tested. Then, any ROM data is copied to the RAM and the ROM is tested. Then the data within the RAM is copied back to the ROM and the RAM is thoroughly erased. Erasing of the RAM is essential to prevent access to ROM data while in test mode. Of course, if the ROM is tested before the RAM, the step of erasing the Ram is obviated. Once the memory is verified, the integrated circuit enters the test mode as per the above-described invention. Since a RAM and an NVRAM or ROM circuit exist within the device, copying of data to maintain data integrity is possible and is used according to the present example to provide for complete circuit testing.

Of course, memory testing is optionally performed before exiting test mode instead of during integrated circuit power up.

Alternatively, the RAM and NVRAM are each accessible during test mode at different times. The input output ports of the integrated circuit device are placed in a predetermined state such that no access to the integrated circuit data is possible and the memory within the NVRAM is copied to the memory that will be inaccessible. Then the memory that is becoming accessible is erased to ensure that no secure data is accessible therefrom and the memory accessible in test mode is switched to the memory that is becoming accessible. Finally, the input output ports are released to normal test operation. In this fashion, extensive user testing of the memory storage is possible.

Of course, memory should be cleared as soon as possible after the time when its contents are copied in order to assure that external access to secure data is other than possible.

Of course, a pin on the integrated circuit is saved by enabling test mode every time the circuit is powered-up and by disabling it with the first secure function performed. As such, until the device is used it is in test mode and thereafter, it is locked in a secure operation mode precluding test mode until it is powered-up again.

Numerous other embodiments may be envisaged without departing from the spirit and scope of the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for storing secure data comprising:
a secure port for receiving secure data; and
test-mode-enable logic coupled to the secure port, the test-mode-enable logic enabling entry of the apparatus to test mode after power is applied to the apparatus and, after data is received through the secure port, causing entry of the apparatus to locked secure-mode state which disables re-entry of the apparatus to test mode while power is applied to the apparatus.

2. The apparatus as claimed in claim 1 further comprising:
a test circuit coupled to the test-mode-enable logic which performs diagnostic functions of the apparatus while the apparatus is in test mode.

3. The apparatus as claimed in claim 1 further comprising:
a test port for receiving test data, the test port coupled to the test-mode-enable logic, the test-mode-enable logic enabling entry of the apparatus to test mode dependent on test data received through the test port within a predetermined time period after power is applied.

4. The apparatus as claimed in claim 1 wherein the test-mode-enable logic automatically switches the apparatus to test mode after power is applied.

5. The apparatus as claimed in claim 1 further comprising:
a memory for storing the secure data.

6. The apparatus as claimed claim 5 wherein the memory is volatile.

7. The apparatus as claimed in claim 5 wherein the memory is non-volatile.

8. The apparatus as claimed in claim 7 further comprising:
a memory erasing circuit which erases data stored in the non-volatile memory upon entry of the apparatus to test mode to prevent external access to stored secure data while the apparatus is in test mode.

9. The apparatus as claimed in claim 5 wherein the memory includes a plurality of banks.

10. The apparatus claimed in claim 5 further comprising:
a data bank switching circuit for disabling external access to each of the plurality of banks storing secure data while the apparatus is in test mode.

11. An apparatus for storing secure data comprising:
a secure port for receiving secure data; and
means for enabling test mode coupled to the secure port, the means for enabling test mode enabling entry of the apparatus to test mode after power is applied to the apparatus and, after data is received through the secure port, causing entry of the apparatus to locked secure-mode state which disables re-entry of the apparatus to test mode while power is applied to the apparatus.

12. The apparatus as claimed in claim 11 further comprising:
means for testing coupled to the means for enabling test mode which performs diagnostic functions of the apparatus while the apparatus is in test mode.

13. The apparatus as claimed in claim 11 further comprising:

a test port for receiving test data, the test port coupled to the means for enabling test mode, the means for enabling test mode enabling entry of the apparatus to test mode dependent on test data received through the test port within a predetermined time period after power is applied.

14. The apparatus as claimed in claim 11 wherein the means for enabling test mode automatically switches the apparatus to test mode after power is applied.

15. The apparatus as claimed in claim 11 further comprising:

means for storing the secure data.

16. The apparatus as claimed claim 15 wherein the means for storing is volatile memory.

17. The apparatus as claimed in claim 15 wherein the means for storing is non-volatile memory.

18. The apparatus as claimed in claim 17 further comprising:

means for erasing data stored in the non-volatile memory upon entry of the apparatus to test mode to prevent external access to stored secure data while the apparatus is in test mode.

19. The apparatus as claimed in claim 15 wherein the means for storing includes a plurality of banks.

20. The apparatus as claimed in claim 19 further comprising:

means for disabling external access to the bank storing secure data while the apparatus is in test mode.

21. A method for storing secure data comprising the steps of:

enabling entry to test mode after power is applied to the apparatus;

receiving secure data on a secure port; and after data is received through the secure port, causing entry of the apparatus to locked secure-mode state which disables re-entry to test mode while power is applied to the apparatus.

22. The method as claimed in claim 21 further comprising:

performing diagnostic functions while the apparatus is in test mode.

23. The method as claimed in claim 21 further comprising:

receiving test data on a test port; and enabling entry to test mode dependent on test data received through the test port within a predetermined time period after power is applied.

24. The method as claimed in claim 21 wherein the step of enabling automatically switches to test mode after power is applied.

25. The method as claimed in claim 21 further comprising the step of:

storing the secure data.

26. The method as claimed claim 25 wherein the secure data is stored in volatile memory.

27. The method as claimed in claim 25 wherein the secure data is stored in nonvolatile memory.

28. The method as claimed in claim 27 further comprising:

erasing data stored in the non-volatile memory upon entry of the apparatus to test mode to prevent external access to stored secure data while in test mode.

29. The method as claimed in claim 25 wherein the step of storing stores the data in a plurality of banks.

30. The method as claimed in claim 29 further comprising the step of:

disabling external access to the bank which stores secure data while in test mode.

* * * * *